US 11,449,556 B2

(12) United States Patent
Jawagal et al.

(10) Patent No.: US 11,449,556 B2
(45) Date of Patent: Sep. 20, 2022

(54) RESPONDING TO USER QUERIES BY CONTEXT-BASED INTELLIGENT AGENTS

(71) Applicant: ACCENTURE GLOBAL SOLUTIONS LIMITED, Dublin (IE)

(72) Inventors: Harsha Jawagal, Bangalore (IN); Sundar Prasad Jayaraman, Chennai (IN); Eldhose Joy, Thane (IN); Ayush Pradhan, Bhubaneswar (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 362 days.

(21) Appl. No.: 16/781,590

(22) Filed: Feb. 4, 2020

(65) Prior Publication Data

US 2021/0240776 A1 Aug. 5, 2021

(51) Int. Cl.
*G06F 16/9032* (2019.01)
*G06F 16/903* (2019.01)
*G06F 40/284* (2020.01)
*G06N 3/04* (2006.01)

(52) U.S. Cl.
CPC .. *G06F 16/90332* (2019.01); *G06F 16/90344* (2019.01); *G06F 40/284* (2020.01); *G06N 3/049* (2013.01)

(58) Field of Classification Search
CPC ......... G06F 16/90332; G06F 16/90344; G06F 40/284; G06N 3/049
See application file for complete search history.

(56) References Cited

U.S. PATENT DOCUMENTS

| 8,700,620 B1 | 4/2014 | Lieberman |
|---|---|---|
| 9,336,485 B2 | 5/2016 | Haggar |
| 10,394,956 B2 | 8/2019 | Zeng |

(Continued)

FOREIGN PATENT DOCUMENTS

| EP | 1107169 A2 * | 6/2001 | ......... G06K 9/00469 |
|---|---|---|---|
| WO | WO-0157786 A1 * | 8/2001 | ......... G06K 9/00442 |

(Continued)

OTHER PUBLICATIONS

Semnani, Domain-Specific Question Answering at Scale for conversational Systems, 33 Conference on Neural Information Processing Systems, 2019, whole document (Year: 2019).*

(Continued)

*Primary Examiner* — Sonia L Gay
(74) *Attorney, Agent, or Firm* — Mannava & Kang, P.C.

(57) ABSTRACT

An automatic question answering system serves to respond to questions pertaining to a user-selected domain of a plurality of domains. A plurality of documents pertaining to the domain are received and processed to identify candidate answers. Questions corresponding to the candidate answers are automatically generated. The candidate answers and the questions are used to train a machine comprehension (MC) model. A user interface allows the selection of one of the plurality of domains for querying by a user. When a user query pertaining to the selected domain is received, the user query is analyzed to identify a relevant context from the plurality of documents. An answer span to the user query identified by the MC model from the relevant context is used to frame a complete response to the user query.

20 Claims, 13 Drawing Sheets

(56) References Cited

U.S. PATENT DOCUMENTS

| | | |
|---|---|---|
| 2004/0249251 A1 | 12/2004 | Olschafskie |
| 2012/0078902 A1 | 3/2012 | Duboue |
| 2014/0280087 A1 | 9/2014 | Isensee |
| 2015/0356089 A1 | 12/2015 | Jamrog |
| 2015/0356181 A1 | 12/2015 | Dettman |
| 2016/0117314 A1 | 4/2016 | Kantor |
| 2016/0314104 A1* | 10/2016 | Phillips ............... G06F 40/151 |
| 2016/0314114 A1 | 10/2016 | Barbetta |
| 2017/0032689 A1 | 2/2017 | Beason |
| 2017/0060945 A1 | 3/2017 | Bastide |
| 2017/0255609 A1 | 9/2017 | Byron |
| 2018/0107648 A1 | 4/2018 | Ackermann |
| 2018/0137419 A1 | 5/2018 | Byron |
| 2018/0137420 A1 | 5/2018 | Byron |
| 2018/0137527 A1 | 5/2018 | Noelting |
| 2018/0137775 A1 | 5/2018 | Byron |
| 2018/0129938 A1 | 10/2018 | Xiong et al. |
| 2019/0026365 A1 | 1/2019 | Karuppasamy |
| 2019/0043379 A1 | 2/2019 | Yuan et al. |
| 2019/0065576 A1 | 2/2019 | Peng |
| 2019/0340172 A1 | 7/2019 | McElvain |
| 2020/0133964 A1 | 4/2020 | Lee et al. |
| 2020/0320984 A1* | 10/2020 | Kuczmarski ............ G06F 40/58 |
| 2020/0334546 A1 | 10/2020 | Muschett |
| 2021/0019374 A1 | 1/2021 | Donaldson |
| 2021/0065042 A1 | 3/2021 | Gopalan |
| 2021/0149994 A1* | 5/2021 | Kim ..................... G06N 3/0454 |
| 2021/0232613 A1 | 7/2021 | Raval Contractor et al. |
| 2021/0374350 A1 | 12/2021 | Nishida |

FOREIGN PATENT DOCUMENTS

| | | |
|---|---|---|
| WO | 2018/085710 | 5/2018 |
| WO | 2019/211817 | 11/2019 |

OTHER PUBLICATIONS

Wang, Qg-net: A data-driven question generation mdoel for educational content, In Proceedings of the Fifth Annual ACM Conference on Learning at Scale, 2018, whole document (Year: 2018).*

Devlin, BERT:PRe-traning of Deep Bidirectional Transformers for Language Understanding, arXiv, 2019, whole document (Year: 2019).*

Lan, Albert: A Lite BERT for Self-Supervised Learning of Language Representations, arXiv, 2019, whole document (Year: 2019).*

Gopali Raval Contractor, et al., "Automatically Generating Natural Language Responses To Users' Questions", U.S. Appl. No. 16/752,148, filed Jan. 24, 2020, 61 pages.

* cited by examiner

CONTEXT

IF THE SUBJECT INFORMATION SHEET AND INFORMED CONSENT DOCUMENT IS REVISED IT MUST BE REVIEWED AND APPROVED BY THE RESPONSIBLE IRB/IEC, AND SIGNED BY ALL SUBJECTS SUBSEQUENTLY ENROLLED IN THE CLINICAL STUDY AS WELL AS THOSE CURRENTLY ENROLLED IN THE CLINICAL STUDY. THE PHYSICAL EXAMINATION INCLUDES AN ASSESSMENT OF GENERAL APPEARANCE AND A REVIEW OF SYSTEMS (DERMATOLOGIC, HEAD, EYES, EARS, NOSE, MOUTH/THROAT/NECK, THYROID, LYMPH NODES, RESPIRATORY, CARDIOVASCULAR, GASTROINTESTINAL, EXTREMITIES, MUSCULOSKELETAL, NEUROLOGIC, AND PSYCHIATRIC SYSTEMS). THE NEUROLOGICAL EXAMINATION INCLUDES ASSESSMENT OF THE CRANIAL NERVES, MOTOR SYSTEM, SENSORY SYSTEM, REFLEXES AND CEREBELLUM. AN SAE IS DEFINED AS ANY UNTOWARD MEDICAL OCCURRENCE THAT: RESULTS IN DEATH. IS LIFE THREATENING: THIS MEANS THAT THE SUBJECT WAS AT RISK OF DEATH AT THE TIME OF THE EVENT. IMPORTANT MEDICAL EVENTS THAT DO NOT RESULT IN DEATH, ARE NOT LIFE-THREATENING, OR DO NOT REQUIRE HOSPITALIZATION MAY BE CONSIDERED SAEs WHEN, BASED ON APPROPRIATE MEDICAL JUDGMENT, THEY MAY JEOPARDIZE THE SUBJECT AND MAY REQUIRE MEDICAL OR SURGICAL INTERVENTION TO PREVENT ONE OF THE OUTCOMES LISTED ABOVE. EXAMPLES OF SUCH MEDICAL EVENTS INCLUDE ALLERGIC BRONCHOSPASM REQUIRING INTENSIVE TREATMENT IN AN EMERGENCY ROOM OR IN A PHYSICIAN'S OFFICE, BLOOD DYSCRASIAS OR SEIZURES THAT DO NOT RESULT IN AN IN-PATIENT HOSPITALIZATION, AND THE DEVELOPMENT OF DRUG DEPENDENCY OR DRUG ABUSE.

CUSTOM QUESTIONS

1. WHAT WILL HAPPEN IF THE SUBJECT INFORMATION SHEET AND INFORMED CONSENT DOCUMENT ARE REVISED?
2. WHAT ARE THE DIFFERENT SYSTEMS THAT ARE INCLUDED IN THE ASSESSMENT OF THE PHYSICAL EXAMINATION?
3. NAME SOME MEDICAL EVENTS THAT ARE NEITHER LIFE-THREATENING NOR CAUSING DEATH, BUT CAN BE CONSIDERED AS A SAE?

DEEP QuAns MODELS AND RESPONSES

VANILLA BERT
1. IT MUST BE REVIEWED AND APPROVED BY THE RESPONSIBLE IRB/IEC
2. PSYCHIATRIC SYSTEMS
3. ANY UNTOWARD MEDICAL OCCURRENCE THAT: RESULTS IN DEATH

DEEP QuAns 192
1. IT
2. DER
3. UNTO

DEEP QuAns 384
1. IT MUST BE REVIEWED AND APPROVED BY THE RESPONSIBLE IRB/IEC
2. THE CRANIAL NERVES, MOTOR SYSTEM, SENSORY SYSTEM, REFLEXES AND CEREBELLUM
3. ALLERGIC BRONCHOSPASM

DEEP QuAns POOL 7
1. IT MUST BE REVIEWED AND APPROVED
2. DERMATOLOGIC, HEAD, EYES, EARS, NOSE, MOUTH/THROAT/NECK
3. UNTOWARD MEDICAL OCCURRENCE THAT: RESULTS IN DEATH

DEEP QuAns POOL 9
1. IT MUST BE REVIEWED AND APPROVED BY THE RESPONSIBLE IRB/IEC
2. DERMATOLOGIC, HEAD, EYES, EARS, NOSE, MOUTH/THROAT/NECK, THYROID, LYMPH NODES
3. UNTOWARD

DEEP QuAns POOL 10
1. IT MUST BE REVIEWED AND APPROVED BY THE RESPONSIBLE IRB/IEC
2. AND SIGNED BY ALL SUBJECTS SUBSEQUENTLY ENROLLED IN THE CLINICAL STUDY
3. BLOOD DYSCRASIAS OR SEIZURES THAT DO NOT RESULT IN AN IN-PATIENT HOSPITALIZATION, AND THE DEVELOPMENT OF DRUG DEPENDENCY OR DRUG ABUSE

FIG. 11

| Context from the Document | User Query | AI Deep Quams Model Response | NLG Framed Response |
|---|---|---|---|
| Depo-Provera must be discontinued at least 6 months prior to CSF and blood collection. As an exception, analgesics, caffeine, and non-pharmacological methods may be used at the discretion of the investigator to manage symptoms related to the lumbar catheterization. 1212 | When should Depo-Provera be discontinued? 1202 | at least 6 months prior to CSF and blood collection 1222 | Depo-Provera should be discontinued on at least 6 months prior to csf and blood collection. 1232 |
| Use of prescription or nonprescription drugs, vitamins and dietary supplements within 7 days or 5 half-lives (whichever is longer) prior to CSF and blood collection are prohibited. 1214 | what type of medications are prohibited prior to blood collection? 1204 | Prescription or nonprescription 1224 | Prescription or nonprescription type of medications are prohibited prior to blood collection 1234 |

RESPONDING TO USER QUERIES BY CONTEXT-BASED INTELLIGENT AGENTS

BACKGROUND

Question answering (QA) is a computer-related field that spans information retrieval and natural language processing and aims to build systems that can automatically answer questions posed by different people in a natural language. Understanding of a natural language by a computer involves the capability of a programmed system to translate sentences into an internal representation so that the computer can generate valid answers to users' questions wherein valid answers can include information responsive to the received questions. A major challenge of QA systems is to provide accurate answers from the vast data that is available online and offline. Research into QA systems attempts to deal with different question types such as facts, lists, definitions, hypotheticals, etc. Further efforts involve dealing with other major challenges of QA such as the lexical gap wherein the same meaning can be expressed in different ways, ambiguity where the same phrase can have different meanings and multilingualism.

BRIEF DESCRIPTION OF DRAWINGS

Features of the present disclosure are illustrated by way of examples shown in the following figures. In the following figures, like numerals indicate like elements, in which:

FIG. 11 shows various custom questions that were posed and a comparison of the answer spans selected by the various deep QuAns models in accordance with the examples disclosed herein.

FIG. 12 shows examples of responses generated to different user queries and the corresponding contexts in accordance with the examples disclosed herein.

DETAILED DESCRIPTION

Figure 1:
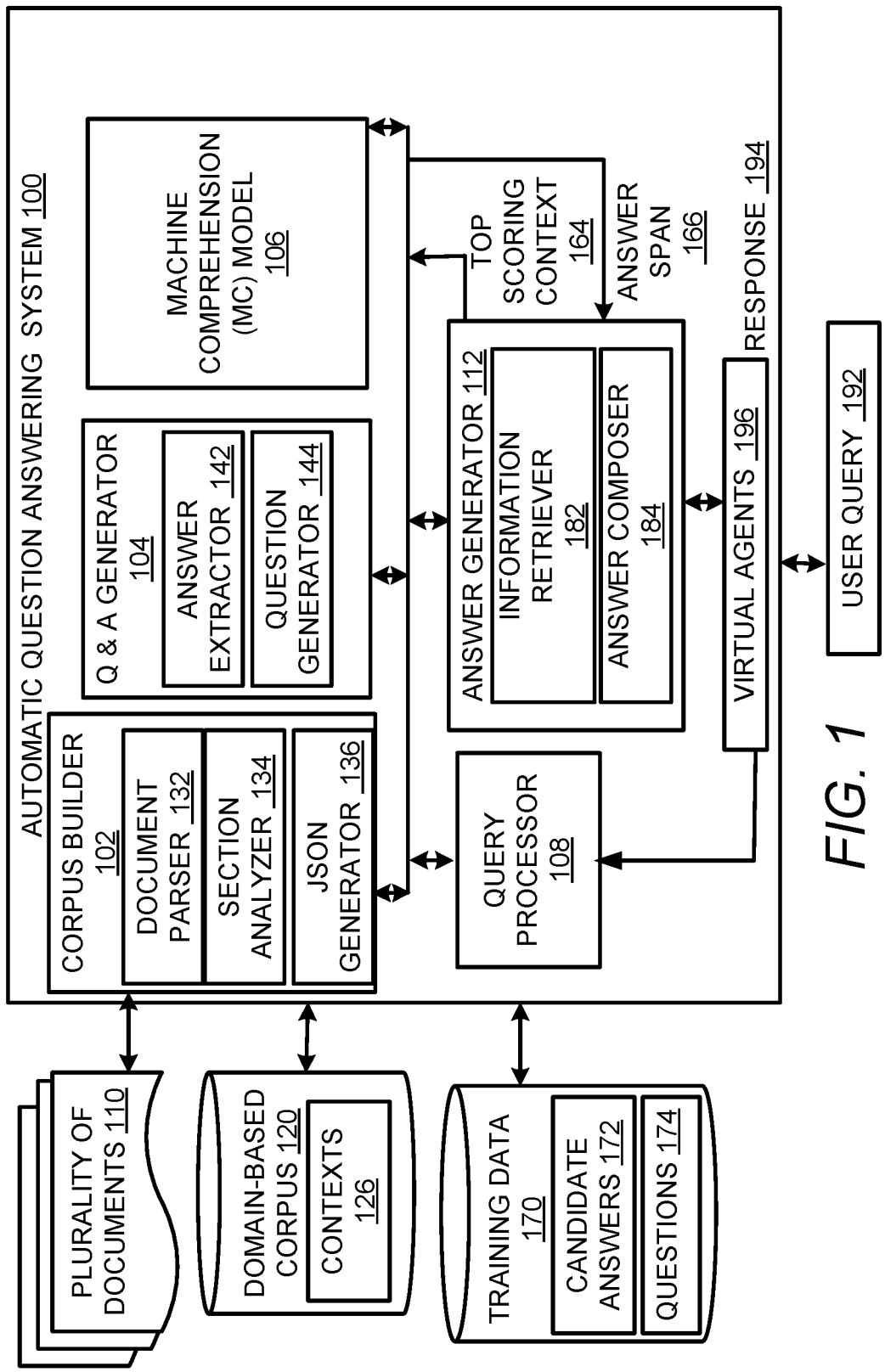
FIG. 1 shows a block diagram of an automatic question answering system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An automatic question answering system that allows users to select a domain from a plurality of domains and automatically generates responses to user queries within the selected domain is disclosed. The automatic question answering system accesses a plurality of documents pertaining to the domain. In an example, a user interface (UI) can be provided to upload a corpus including the plurality of documents. The plurality of documents include domain-specific information that can be organized into a plurality of sections wherein the information in one or more of the sections is organized into a plurality of sub-sections. The plurality of documents are parsed using machine learning (ML) techniques for splitting the documents into the sections and sub-sections. The plurality of documents are parsed and the associated metadata including the title, list of sections, list of figures and tables, references etc. The section identification includes caption detection wherein different captions including titles and sub-titles of the plurality of sections and sub-sections are detected. In addition, the section identification includes region identification and classification wherein pages of the plurality of documents are chunked into different regions categorized as a caption, body text which makes up the bulk of the document content, table text, images, etc. In an example, only captions and body text may be identified and categorized. The body text can include paragraphs that have specific font attributes (e.g., font size, font style, etc.) and text alignment characteristics that are employed for text classification into captions and body text.

Upon extracting and classifying the textual content of the plurality of documents, the automatic question answering system extracts candidate answers followed by questions conditioned on corresponding contexts and the candidate answers. The candidate answers can include candidate key phrases (C-KPE) extracted from the contexts using unsupervised, multi-lingual machine learning (ML) models such as Yet Another Keyword Extractor (YAKE) that builds upon the statistical text features and does not use any named entity recognition (NER) or parts of speech (POS) taggers. The text extracted from the plurality of documents is tokenized into word tokens wherein each word forms a token and word-specific statistical features are considered such as positioning and frequency of the word tokens, word relatedness etc. The extracted features are used to generate a single term score (TS) for each of the word tokens.

Sequences of n-grams are generated from contiguous word tokens in the document text and a final score is calculated for the n-gram sequences using the single term scores (TSs) of each of the word tokens in the n-gram sequences. The n-grams for a given document are deduplicated and the top N (wherein N is a natural number) scoring n-grams are selected as candidate answers for that document. Similarly, candidate answers can be obtained for each of the plurality of documents.

The automatic generation of questions corresponding to the candidate answers includes the use of a Seq2Seq model equipped with Bandanau Attention mechanism. The question generation process requires two components including a deep bidirectional context and answer encoder which can include a long short term memory (LSTM) followed by a unidirectional decoder including the pointer-Softmax mechanism. The preprocessed sections or contexts of each document are input to the context encoder whereas the candidate answers corresponding to each of the contexts serve as an input to the answer encoder. The sequence of the context and answer elements input to the context encoder and the answer encoder are provided by a pre-trained initialized 300-dimensional Global Vectors (GLOVE) embedding which is an unsupervised learning algorithm for obtaining vector representations for words. During the encoding process, each embedding vector is augmented with a binary feature that illustrates the presence of the word token in a corresponding context. The augmented context embedding is further processed by the deep bidirectional LSTM to generate a compound vector (hc) or a context embedding which is augmented with the answer embedding (ha) and again passed through the bidirectional LSTM which results in a thought vector that is later passed through a decoder input. The decoder includes a unidirectional LSTM network which enables computing an attention score based on the Bandanau's attention mechanism over the corresponding contexts to identify the most relevant words for a generated question.

The candidate answers and the questions thus generated are provided to a machine comprehension model (MC) to train the MC model to identify an answer span to a given user query within a specified context. In an example, the MC model is trained on a generic dataset such as the Stanford Question Answer dataset (SQuAD) and including the candidate answers and the questions that were automatically generated. Further, the MC model implements a 3-layer deep question answering (QA) architecture before the final output layer with varying hidden size having a predetermined number of neurons that better captures the starting and the ending positions of an answer span within a given context. The answer span includes one or more sentences in a given context (e.g., a paragraph) that include information responsive to a user query. One configuration of the 3-layer architecture can be made up of linear layers where all the layers have a hidden size of 384 or 384 hidden neurons while the second configuration can include 2 layers with a hidden size of 384 followed by a third layer with a hidden size of 192. As part of the extension of fine-tuning pooling of the 7th, 9th and the 10th layer of the encoder can also be implemented.

When a query is received from a user, it is preprocessed and parts of speech (POS) data associated tokens generated from the user query are extracted. In an example, the POS data can include a subject of the user query. Using a term vector model scoring, a context from a set of contexts associated with the plurality of documents is determined as relevant to the user query. The query and the context determined to be relevant to the query are provided to the MC model which identifies an answer span that includes information requested in the query. A response to the query is generated in a complete sentence framed in accordance with the grammar and which includes the information from the identified answer span. The generated response can be provided to the user via a user interface which can include, for example, a virtual agent or a bot.

The automatic QA system disclosed herein provides a technical solution to a technical problem wherein virtual agents configured with the MC models can handle generic questions but fail to scale to different verticals or domains. Machine Reading Comprehension (MRC in short) primarily has two components namely Question querying and Question Answering (QA). In order to augment the knowledge and understanding of the specific domain, questions are posed by people to access a peer's knowledge and to boost up our information-seeking demeanor. Question Generation (QG) is a critical but arduous task in NLP as it not only ameliorates QA training but also enhances the user's experience with focus areas spanning from the interaction of chatbots with humans, FAQs designing, search engines, automated support systems, etc. to automated questionnaires for educational purposes. Primarily, QG involves generating relevant, semantically and syntactically correct questions from diverse input categories like text, knowledge or structured database. The ensemble inception of QG and QA aims to alleviate the tedious and mundane task to create handcrafted questions and enables uncovering answers to the domain-specific questions.

The task of QG can be typically classified into two major domains; close-ended and open-ended questions. The close-ended questions primarily deal with extracting direct sequences of text from the document (e.g. Which, Where, What, When, etc.). The purpose of open-ended questions (e.g. How, Why, etc.) is comparatively an abstract one as it essentially requires external knowledge combined with existing contextual information to frame significant questions. Further, answering open-ended questions can be challenging as it requires a selection of multiple occurrences of a text to frame the final answer. Thus, the art of appropriate question querying, and answer retrieval is a pivotal aspect of data acquisition in several intelligent systems. Posing relevant and valuable questions to systems such as virtual agents or bots strengthens the expertise of such systems to answer the questions. Further, a credible question can be constructed in numerous ways by deriving information and relations from a typical document while uniquely specifying the concerned answer. The creation of state-of-the-art domain-specific datasets is not only labor-intensive and expensive but such datasets can lack the complexity, diversity of questions posed by different users and may include inherent biases in various aspects like capturing domain-coverage, rhetoric flavor, etc. Thus, the domain of automatic question generation (AQG) assumes significance in that it not only improves efficiency in the development of QA systems but also enables improving the quality of the QA systems being developed by removing the inherent biases that may creep in when handcrafted datasets are used.

FIG. 1 shows a block diagram of an automatic QA system 100 that serves to respond to questions pertaining to a plurality of domains in accordance with the examples disclosed herein. The QA system 100 receives a plurality of documents pertaining to a specific domain of the plurality of domains such as finance, healthcare, insurance, manufacturing or education, etc. and employs the plurality of documents 110 to train the QA system 100 in responding to questions from users regarding the specific domain. The plurality of documents 110 can include numerous sections with each section further including one or more sub-sections. In addition, the plurality of documents 110 can include not only plain text but also text in tabular formats and may further include image text. The plurality of documents 110 can also include documents of different formats such as word processing documents (.doc), portable document files (.pdf), plain text (.txt), etc. If different documents are received in different formats, then the various documents may be converted into a common format, e.g., pdf format, for easier processing. The documents can relate to various domain-based issues peculiar to a given domain. For example, the documents may relate to patient healthcare policies or clinical trial protocols in the healthcare domain. Similarly, the documents may relate to insurance policies in the insurance domain or to other compliance policies in the finance domain. The QA system 100 enables building a domain-specific virtual agent that can process domain-specific queries and produce precise and grammatically accurate responses to user queries.

The QA system 100 includes a corpus builder 102, a Q & A generator 104, an MC model 106, a query processor 108 and an answer generator 112. The corpus builder 102 processes the documents to build a domain-based corpus 120 that stores the domain-specific information included within the plurality of documents 110. The domain-based corpus 120 can be used by the Q & A generator 104 to automatically generate training data 170 which includes candidate answers 172 and questions 174 corresponding to the candidate answers 172 for training the MC model 106. The MC model 106 obtains information processed from a received user query 192 by the query processor 108 and identifies an answer span 166 within a context from the plurality of documents 110. In an example, where the answer span 166 forms a complete sentence, the answer span 166 can be provided directly to the user as the response 194 without further processing by the answer composer 184. If, however, it is determined by the answer composer 184 that the answer span 166 does not include a complete sentence, then the answer span 166 within the context is provided to the answer composer 184 so that a complete answer can be generated and provided as a response 194 to the user posing the user query 192.

The corpus builder 102 includes a document parser 132 and a section analyzer 134. The document parser 132 can produce a stream of text by parsing the plurality of documents 110. In addition, metadata associated with the content such as an indication of the titles, list of sections, list of figures, tables and references, etc. is also obtained. The information within the plurality of documents 110 can be organized into a plurality of sections with each section being further sub-divided into one or more sub-sections. The parsed text from the document parser 132 along with the metadata can be accessed by the section analyzer 134 for identifying sections within each of the plurality of documents 110 via identifying captions, identifying different regions of the document pages as captions, body text, figure/table text, images, etc., and text selection and classification which entails classifying the document text as body text or figure/table text.

The textual content is first extracted from each of the plurality of documents 110 and a keyword search may be employed to identify keywords/phrases that indicate the beginning of captions in a document. Moreover, a majority of the plurality of documents 110 primarily include a large portion of body text which can follow a steady formatting pattern throughout the document. Therefore, several statistical heuristics such as identifying the font most commonly used within the document, for example, the font used in the body text, font-size, line width, distance between lines and the words, left margins, etc. can be used iteratively in the plurality of documents 110 to efficiently gauge the perimeter of the body content. Furthermore, the section titles that encompass the text content can follow a diverse pattern by detecting anomalous text that starts with a number or with capital letters, aligned to a margin or is centered or is of a non-standard font and size as compared to the body content. For each of the sections that are identified in the plurality of documents 110, one or more sub-sections may also be identified. Once the titles/sub-titles and the associated content is identified, the remaining textual content can be organized into groups with each group including one or more paragraphs which can be stored as contexts 126 in the domain-based corpus 120. More particularly, the contexts 126 from each of the domain documents can be provided with a corresponding unique id in the domain-based corpus 120 using JSON. When the user query 192 is received, a top scoring context 164 is identified from the domain-based corpus 120 and provided along with the information processed from the user query 192 to the MC model 106 for identifying the answer span within the context.

The Q & A generator 104 accesses the domain-based corpus 120 to generate training data 170 which can include the candidate answers 172 and questions 174 corresponding to the candidate answers 172. Therefore, the Q & A generator 104 includes an answer extractor 142 and a question generator 144. The answer extractor 142 extracts candidate key phrases (C-KPE) as the candidate answers 172. In an example, the answer extractor 142 can include unsupervised multi-lingual keyword extraction models such as YAKE for the candidate answer extraction. Unlike other keyword extraction systems, YAKE does not rely on dictionaries or thesauri and neither is YAKE trained against any corpora. Instead, YAKE is implemented via an unsupervised approach that builds upon the feature extraction from the text in the plurality of documents 110 without employing any named entity recognition (NER) techniques or Parts of Speech (PoS) taggers. Features such as but not limited to word frequency and co-occurrence of the words in a given context, word relatedness etc. are extracted and scored in accordance with methodologies detailed herein. The key phrases thus scored are de-duplicated and the top-scoring key phrases can be selected as the candidate answers 172 by the answer extractor 142.

The question generator 144 includes an improved Seq2Seq model which is equipped with Bandanau attention mechanism. The question generator 144 includes two components, namely a deep bi-directional context and answer encoder followed by a unidirectional decoder with a pointer-Softmax mechanism. In an example, the training and evaluation of the Seq2Seq scheme were performed based on the training, validation and test split of the SQUAD dataset. The questions 174 corresponding to the candidate answers 172 are thus generated by the Seq2Seq model trained on the SQUAD dataset. In an example, subject matter experts can annotate more questions and answers with their knowledge expertise from the plurality of documents 110 which can further enhance the quality of the generated training dataset 170. The candidate answers 172 and the questions 174 can be converted to a SQUAD JSON format which is a standardized form of training sets that are used to train question answering systems and to effectively measure the performance parameters.

The candidate answers 172 and the questions 174 that were automatically generated from the plurality of documents 110 are used as training data 170 for the MC model 106 in order to enable the MC model 106 to identify answer spans to user queries within specific contexts. Therefore, a standard training data set is created for a specific domain using domain-specific documents included within the plurality of documents 110. In an example, the MC model 106 implements a deep QA architecture that is fine-tuned to include a final linear layer at the decoder to predict the start position and the end position of an answer from a given context. More particularly, a 3-layer deep QA architecture is implemented before the final output layer with varying the hidden size to better capture the start and the end positions. Two different configurations can be implemented wherein the 3-layer network is made up of linear layers with each of the layers having a hidden size of 384. A second configuration can also be implemented wherein two of the linear layers have a hidden size of 384 followed by a third layer with a hidden size of 192. As part of the extension of the fine-tuning, pooling can also be implemented at the $7^{th}$, $9^{th}$ and the $10^{th}$ layer of the encoder.

When the user query 192 is received, it is analyzed by the query processor 108 which can tokenize and parse the user query 192. The resulting query words are employed by an information retriever 182 included in the answer generator 112 for an inverted index lookup followed by the scoring of the plurality of documents 110 using a term vector model scoring. The information retriever 182 thus returns the top N contexts (where N is a natural number and N=3 in an example) for the user query 192 and the top-scoring context 164 is provided to the MC model 106. The MC model 106 identifies an answer span 166 to the user query 192 from the top-scoring context 164. The answer span 166 can be provided as the response to the user query 192. In an example, the answer span 166 can be employed by an answer composer 184 to frame a response 194 including the answer span 166 which can be returned to the user who initially posed the user query 192. In an example, the response 194 can be provided via a chat window coupled to the QA system 100 or other virtual agents 196 such as bots. In an example, the QA system 100 can be coupled to existing virtual agents or bots in order to enable automatic domain-based question answering as detailed herein.

Although the above description pertains to training the QA system 100 to analyze the plurality of documents 110 pertaining to a specific domain and handling user queries pertaining to that domain, it can be appreciated that different versions of the QA system 100 can be similarly trained to handle user queries in different domains. For example, corpora pertaining to different domains may be uploaded and different ML models can be trained to analyze the documents, extract the answers, generate the questions and train the corresponding MC models for the corresponding domains. Thus, a plurality of MC models can be generated corresponding to a plurality of domains. In an example, the user may be further permitted to select a domain and have a corresponding MC model loaded into the QA system 100 in order to automatically respond to queries corresponding to the selected domain.

Figure 2:
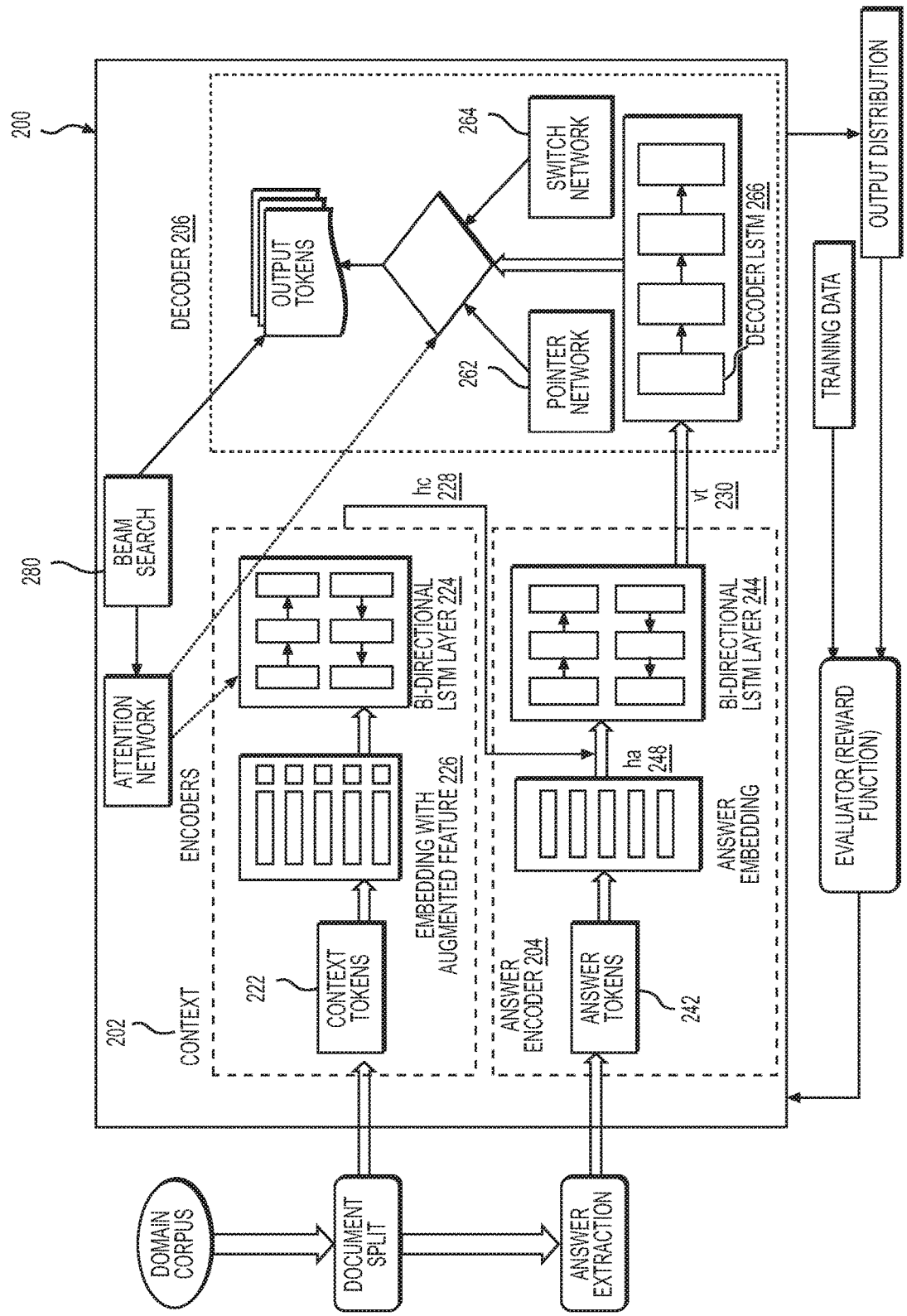
FIG. 2 shows a block diagram of a model employed in a question generator in accordance with the examples disclosed herein.

FIG. 2 shows a block diagram of a Seq2Seq model 200 employed in the question generator 144 for automatically generating the questions in accordance with an example. As mentioned above, an improved Seq2Seq model which is equipped with Bandanau attention mechanism is used for the question generator 144. The question generator 144 includes two components, namely a deep bi-directional context encoder 202 and an answer encoder 204 followed by a unidirectional decoder 206 with a pointer-Softmax mechanism. The pre-processed sections Ci (C1, C2, ... Cn) of each document or context tokens 222 form the input to the context encoder 202 which can include a bi-directional Long Short Term Memory (LSTM) layer 224. Similarly, the potential extracted answers Ai (A1, A2, ..., An) or answer tokens 242 where Ai belongs to each context Ci serve as a key input to the answer encoder 204. The context tokens 222 and the answer tokens 242 are given by a pre-trained initialized 300-dimensional GLOVE embedding in an example. During the encoding process, each embedding vector is augmented with a binary feature to illustrate the presence of a given word token in a context. Further, the augmented context embedding 226 is run through the deep bi-directional LSTM layer 224 to generate a compound vector (hc) 228 by concatenating or a consecutive cell states including the cell forward states and cell backward states. The context embedding (hc) 228 is augmented with answer embeddings (ha) 248 and passed on through another bi-directional LSTM 244 included in the answer encoder 204. The resulting extractive condition encoding (vt) 230 is passed on as the decoder input.

The decoder 206 is a unidirectional LSTM network and the cell state (st) is computed as:

$$st = \text{LSTM}(st-1, yt-1, vt) \qquad \text{Eq. (1)}$$

where st−1 represents the previous encoder state and yt−1 depicts the initial input sequence to the decoder 206. At each time step t, an attention score is computed by summing the attention scores over the compound vector and thereafter the concatenated with the answer embeddings to produce the thought vector which can be obtained as:

$$vt = [X|C|l=1 \alpha ih\ d\ l\ ;\ ha] \qquad \text{Eq. (2)}$$

At each time step, a deep output layer is used for the shortlist vector that combines the information from the vt, st and the yt−1 though a neural net to predict the word logits for the Softmax. The Softmax layer consists of a shortlist vocab which places a word distribution over the pre-defined output vocab. Further, there can be a pointer network 262 which places a distribution over context tokens to be copied. The switch network 264 enables interpolating between the shortlist word generation and document copying. During decoding, beam search 280 is used to maximize the conditional probability of an output sequence.

In an example, the Seq2Seq question generation architecture as shown in model 200 can be implemented in Python using Tensorflow. The word embeddings can be initialized using pretrained GLOVE with 300-dimensional embedding. A two-layer bi-directional LSTM layer can be used for both the context encoder 202 and the answer encoder 204 followed by a single unidirectional layer in the decoder 206 shown as the decoder LSTM 266. The number of hidden units in the LSTM cell can be fixed to, for example, 768 based on the maximum length of the context. The switch units in the decoder were set to 384. During the decoding, the beam size can be set to 15. The optimization can be performed using Adam optimizer and the model 200 can be trained for example, for 25 epochs with a target of minimizing the NLL value. It can be appreciated that the hyperparameters for the model 200 are discussed only for illustration purposes and that the hyperparameters can be fine-tuned with respect to the different domains in order to achieve optimum results during inference.

Figure 3:
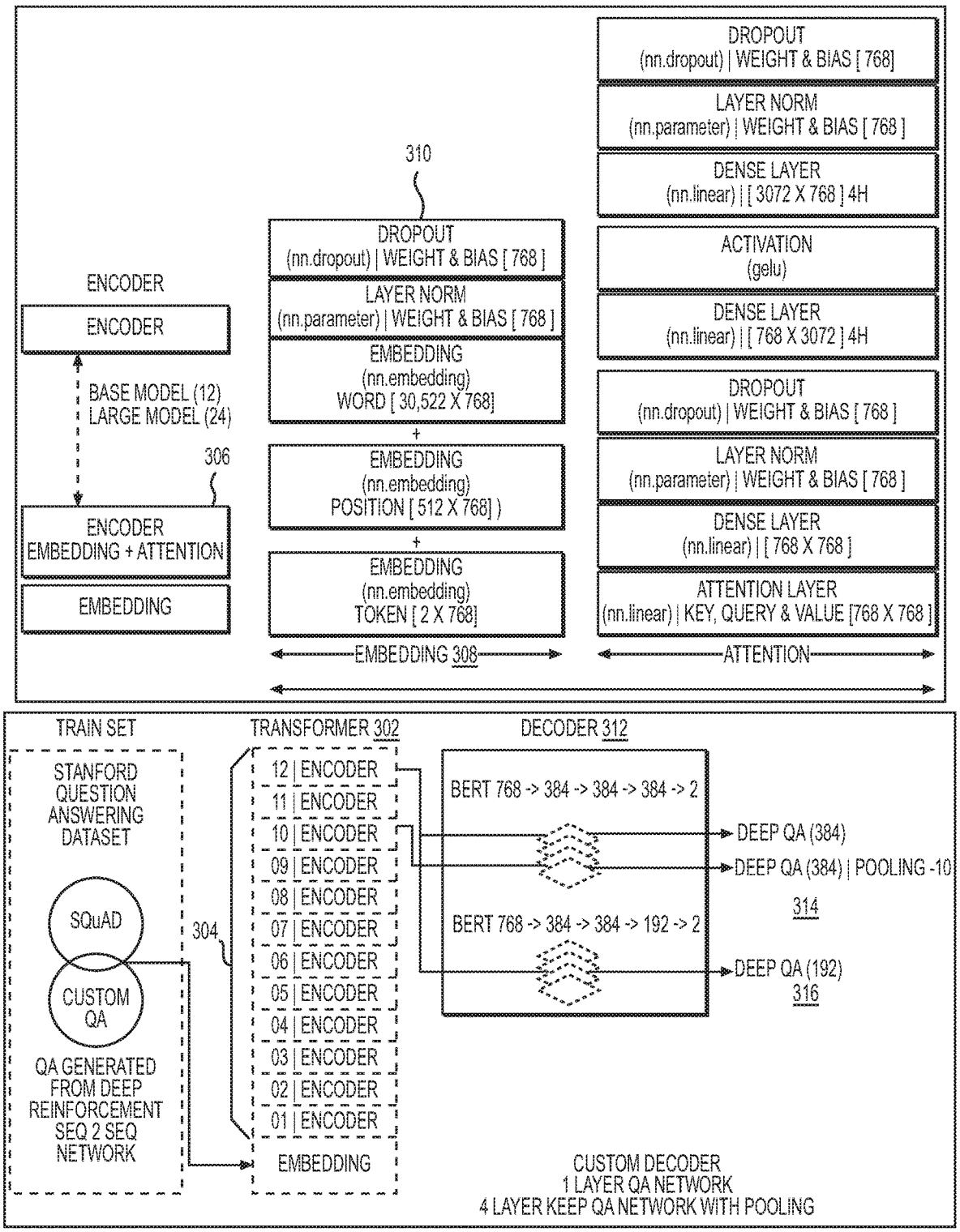
FIG. 3 shows a block diagram of the various layers in a machine comprehension (MC) model in accordance with the examples disclosed herein.

FIG. 3 shows a block diagram of the various layers in the MC model 106 in accordance with the examples disclosed herein. The MC model 106 is based on the Bidirectional Encoder Representations from Transformers (BERT) which applies the bidirectional training for a deeper sense of language context and flow as compared to single-direction language models. Transformer, an attention mechanism that is applied in BERT learns contextual relations between words (or sub-words) in a text. In an example, the transformer includes two separate mechanisms—an encoder that reads the text input and a decoder that produces a prediction for the task. Unlike directional models which receive text input sequentially, the Transformer encoder reads an entire sequence of words at once or in parallel. This characteristic allows the BERT model to learn the context of a word based on all of its surroundings.

The MC model 106 includes a 3-layer deep Question Answering (QA) architecture before the final output layer with varying hidden size to better capture the start and end positions of an answer span in a context. This solution can be implemented with two different configurations of the 3-layer network that is made up of linear layers which include attention layers and Softmax. In one configuration, all the 3 layers can have a hidden size of 384. In another configuration, 2 layers can have a hidden size of 384 followed by a third layer with a hidden size of 192. The MC model 106 includes a Transformer 302 with a number of encoders 304. In an example, the Transformer 302 includes 12 encoders. However, a greater number of encoders may be included if required. An encoder 306 includes embedding layer and attention layers while embedding layer 308 which is used to convert the contexts into corresponding tensors includes a dropout layer 310.

The MC model 106 is trained on generic data sets such as the SQuAD, NewsQA, etc., in addition to a custom QA dataset which pertains to the training data 170 which is generated from deep reinforcement using the Q & A generator 104. By using a domain-based training data set such as the training data 170, the MC model 106 is better enabled to analyze and respond to domain-specific user queries. Different examples of the decoder 312 are shown with the corresponding parameters. In an example, the decoder 312 can include a BERT architecture with 3 layers, each including 384 neurons with a pooling of 10 as shown at 314. In another example shown at 316, the decoder 312 can include a BERT architecture with 3 layers, wherein two layers include 384 neurons and a third layer with 192 neurons.

Figure 4:
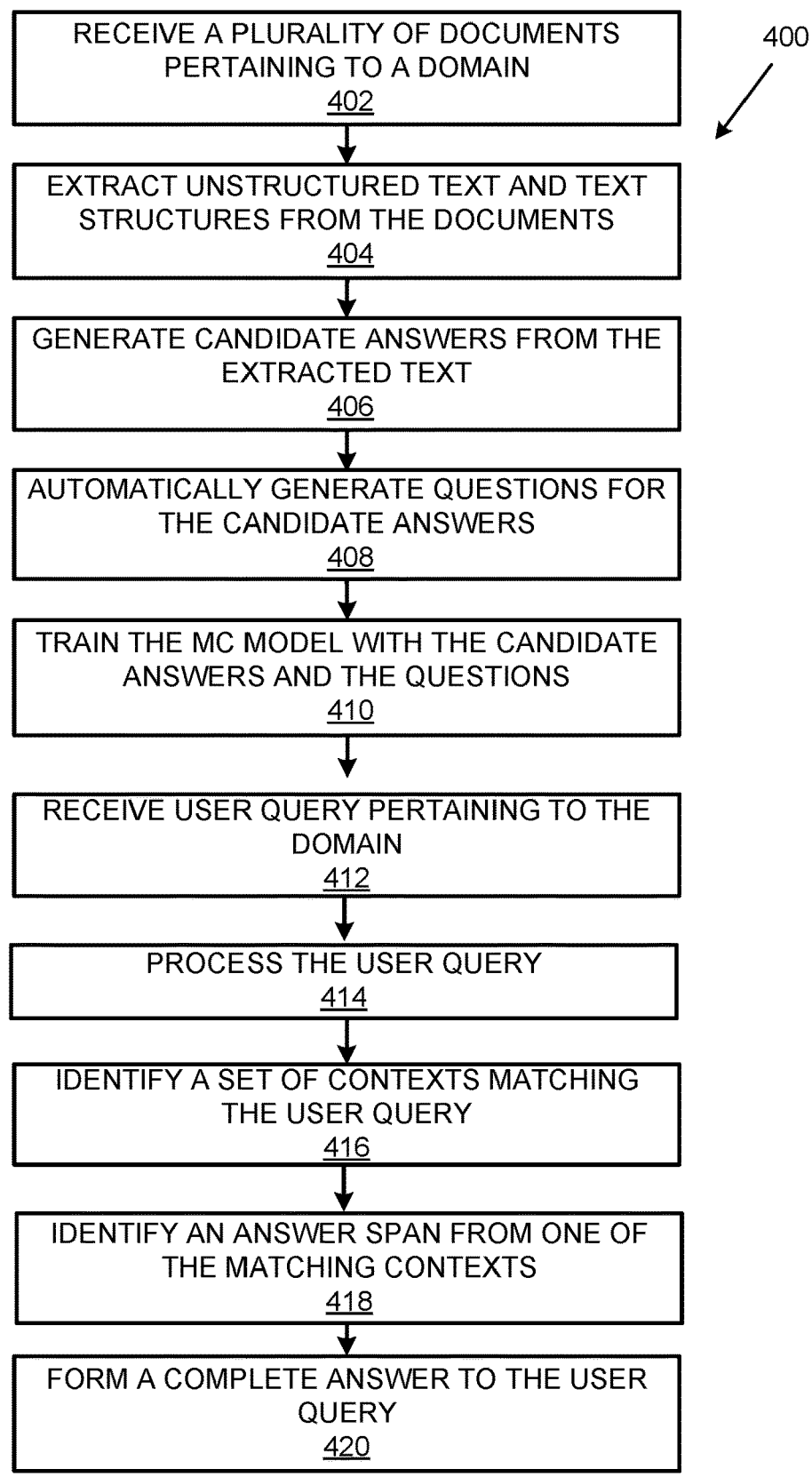
FIG. 4 shows a flowchart that details a method of automatically generating responses to user queries pertaining to a specific domain in accordance with the examples disclosed herein.

FIG. 4 shows a flowchart 400 that details a method of automatically generating responses to user queries pertaining to a specific domain in accordance with an example disclosed herein. The method begins at 402 wherein a plurality of documents 110 is received. More particularly, the plurality of documents 110 pertains to a specific domain. Different types of documents can be received based on the specific domain and the particular use for which the QA system 100 is being employed. In an example pertaining to the healthcare domain, various documents pertaining to prior clinical protocols can be generated in order to respond to queries regarding the development of a protocol for a new clinical trial. Similarly, in the insurance domain, documents pertaining to the standard terms and conditions based on statutory and regulatory requirements can be received and provided to the QA system 100 for training. Other examples of documents pertaining to other domains can be received based on which the QA system 100 is configured to handle the queries corresponding to such specific domains. In an example, the plurality of documents 110 can be received via a user upload from a data source. In another example, the plurality of documents 110 may be extracted from monitored inboxes At 404, the plurality of documents 110 are processed to extract unstructured text and the various text organizational structures such as the sections and sub-sections. In an example, ML techniques as outlined herein can be employed for the identification of the sections and the sub-sections as different documents can have different text organizational structures. The text thus extracted is used to generate one or more candidate answers 172 at 406. In an example, the candidate answers 172 can include key phrases so that for each of the identified sections and sub-sections, the relevant key phrases or key entities in the subsections of the documents can be extracted using ML-based candidate key phrase extraction (C-KPE) techniques. The candidate answers 172 can then be employed at 408 to automatically generate the questions 174 that correspond to each of the candidate answers 172. In an example, a question corresponding to each of the candidate answers 172 is generated at 408. In an example, the questions can be generated using the Seq2Seq network using a bi-directional context and an answer encoder network. A beam search can be used to maximize the condition probability of an output sequence during the question generation. Training data 170 including the candidate answers 172 and the questions 174 can be used at 410 to train the MC model 106 to automatically identify answer spans in received contexts for user queries.

At 412, the user query 192 pertaining to the specific domain corresponding to the plurality of documents is received. The user query 192 is processed, for example, tokenized and tagged with POS data at 414. Techniques such as bi-gram hashing and TF-IDF matching can be employed at 416 to identify a set of contexts (i.e., paragraphs) specific to the domain to the MC model 106 and matching the user query 192 to identify an answer span at 418 from a context of the set of contexts. A complete answer to the user query 192 is formed at 420 and provided to the user in response to the user query 192.

Figure 5:
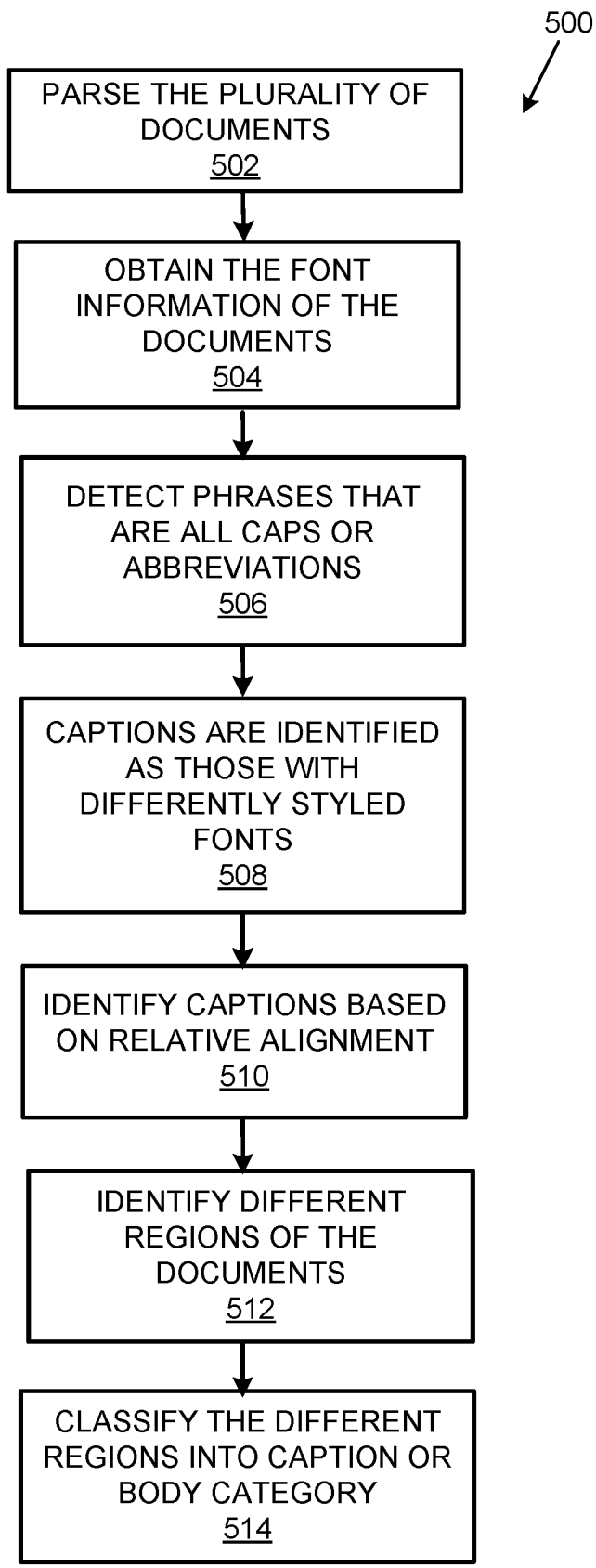
FIG. 5 shows a flowchart that details a method of identifying sections and sub-sections within the plurality of documents in accordance with the examples disclosed herein.

FIG. 5 shows a flowchart 500 that details a method of identifying sections and sub-sections within the plurality of documents 110 in accordance with the examples disclosed herein. The plurality of documents are parsed at 502 and the information regarding the font of the textual content in the plurality of documents 110 is obtained at 504. In an example, tools such as but not limited to PDFminer or PyPDF2 can be used to obtain the font data such as font style, font size, font color, and other font attributes. At 506, the phrases that are styled differently such as all capital letters or abbreviations are initially detected and classified as section headers. In addition, other filters are also applied to detect sections headers. At 508, the font sizes and styles between different textual content can be compared and phrases with different font styles and sizes as compared to the bulk of the document can be identified as section headers. Furthermore, the alignment of phrases can be identified and compared. Therefore, phrases occupying a single line or which are left-aligned or center-aligned with respect to the following bulk of the text, are identified at 510 as section/sub-section headers based on the relative alignment. After detecting the captions or headers of the various sections/sub-section, the different regions of the documents corresponding to the captions and the body of text are identified at 512 and classified into the corresponding caption or body category at 514. A caption region is identified with an extracted caption combined with the following lines of text. The remainder of textual content is organized into a group of paragraphs which can be classified as body category. In an example, each context specific to a domain can be stored in the database with a unique id. The unique ids and contexts can be updated each time a new document corresponding to a domain is received or uploaded.

The edge cases include the information regarding the page headers and numbers which may also form a part of the body text if the document pages frequently contain the same data throughout the entire document. However, the above information is of lesser significance in analyzing the context as the extracted content of one page is augmented with the header and footer info resulting in a loss of sequential information across pages. Therefore, the above data is truncated and the extracted region text from its previous page is concatenated with the next page in the post-processing. The body text usually forms most of the content in a document and follows a steady formatting pattern throughout the document. Thus, the body text is dependent on several statistical heuristics like identifying the most common font, font-size, line-width, distance between lines and words, left margins, etc. used in the document to efficiently gauge the perimeter of the body content. Further, the section titles that encompass the text content follow a diverse pattern by detecting anomalous text that starts with a number, caps, is of a non-standard font & size, aligned to a margin or is centered, etc.

Figure 6:
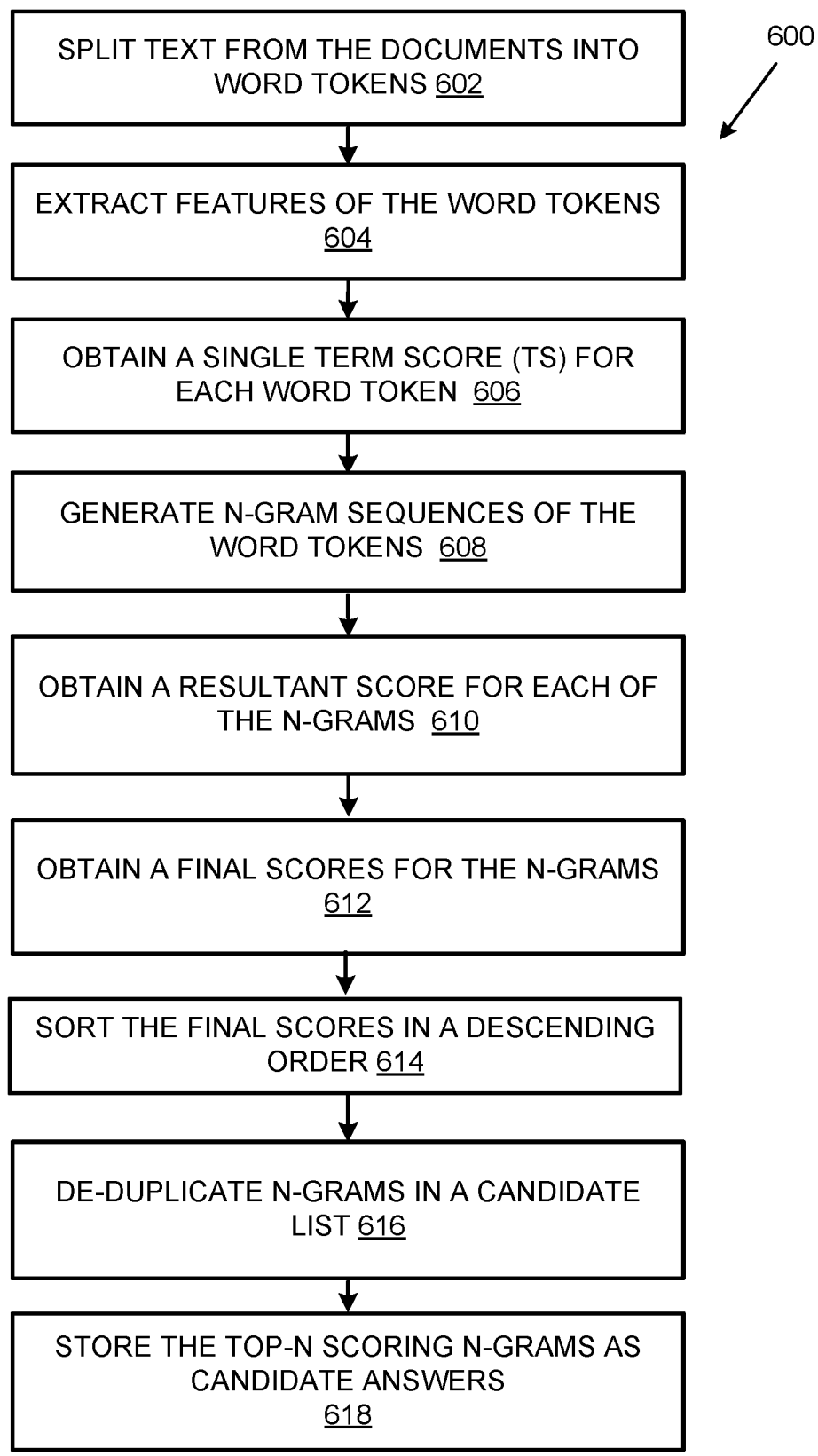
FIG. 6 shows a flowchart that details a method of generating candidate answers from the plurality of documents in accordance with the examples disclosed herein.

FIG. 6 shows a flowchart 600 that details a method of generating candidate answers from the plurality of documents 110 in accordance with the examples disclosed herein. The method begins at 602 wherein the text obtained from the plurality of documents 110 is split into unique word tokens, based on, identification of empty spaces or unique character delimiters (e.g., commas, brackets, line breaks etc.) At 604 various features of the unique word tokens are extracted including the positioning of the word tokens, relatedness of the word tokens to the context from which they were extracted, and the frequency of occurrence of the word tokens. For example, if the positioning feature indicates that a word token occurs often at the beginning of a text, then the word token can be weighted as a potential candidate answer. Similarly, if the number of different terms found in the neighborhood a given word token is greater than a predetermined threshold, then that word token is disregarded from being a candidate answer. Therefore, the features entailing word frequency along with how often a given word occurs in different sentences along with the word relatedness to its context primarily summarizes the candidate feature extraction process.

The features of the word tokens thus extracted are conglomerated heuristically into a single term score (TS) for each of the word tokens at 606. At 608, sequences of n-grams that include n word tokens (where n is a natural number) are produced by using a sliding window of n-grams on word tokens contiguously arranged in their order of occurrence within the original text. At 610, the TS of the word tokens in each of the n-grams is multiplied with the TS of the subsequent word tokens in the n-gram to obtain a resultant score for the n-gram. At 612, the resultant score of each of the n-grams is averaged out with the term frequency (TF) of that n-gram in a respective candidate list corresponding to the document being processed in order to obtain the final scores of the n-grams. The final scores are sorted at 614 in a descending order. The n-grams are deduplicated at 616 and the top N (where N is a natural number) scoring n-grams are stored at 618 as a subset of the candidate answers 172 generated from a given document in the plurality of documents 110.

Figure 7:
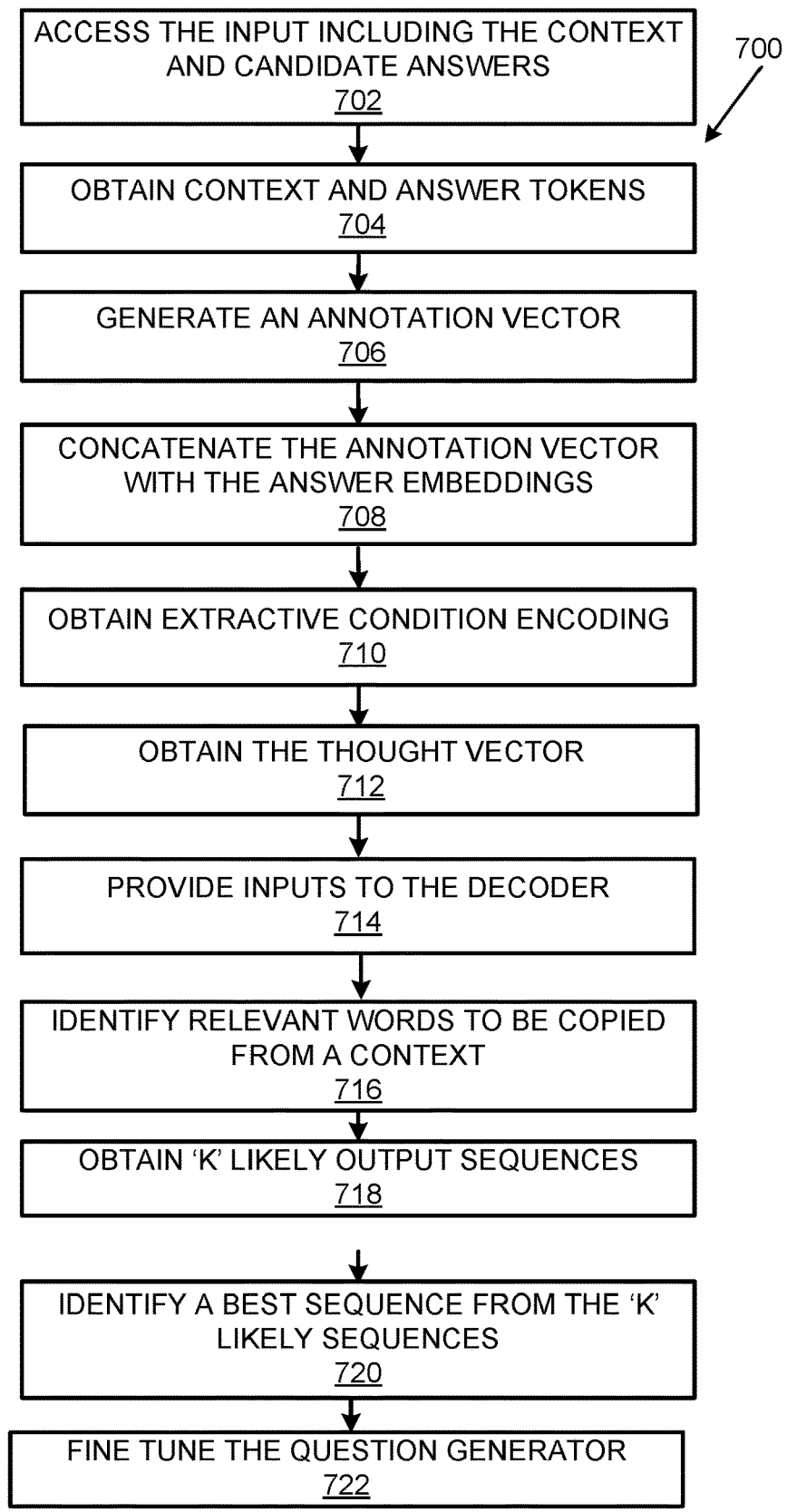
FIG. 7 shows a flowchart that details a method of generating questions for the candidate answers in accordance with the examples disclosed herein.

FIG. 7 shows a flowchart 700 that details a method of generating questions for the candidate answers in accordance with the embodiments disclosed herein. At 702, the input to the question generator 144 including a specific context and the candidate answers extracted from the context is accessed. As mentioned above, the question generator 144 can include a Seq2Seq model with at least the context encoder 202, the answer encoder 204 and the decoder 206. The context and the candidate answers are split into corresponding context tokens 222 and the answer tokens 242 by the context encoder 202 and the answer encoder 204 respectively at 704. At 706, an annotation vector is generated from the context tokens. In an example, the context tokens 222 are converted into corresponding numerical representations (embeddings) and the context embeddings are augmented with a binary feature based on whether the candidate answer is responsive to a given user query. The augmented context embeddings are passed on to the bi-directional LSTM layer 224 in order to generate the annotation vector.

At 708, the answer tokens 242 are embedded and the annotation vector which is passed on to the answer encoder 204 is concatenated with the answer embeddings. The concatenated embeddings are passed on to the bi-directional LSTM layer 244 to obtain an extractive condition encoding at 710. At 712, a thought vector is obtained using the annotation vector. The attention scores (or soft alignment scores) are initially summed over the annotation vector which are thereafter concatenated (i.e., dot multiplied) with the extractive condition encoding 230 and the final attention scores are normalized to obtain the thought vector. At 714, the inputs including the extractive condition encoding 230 and the thought vector are provided to the decoder 206.

At 716, the relevant words to be copied from the context for generating the questions are identified. The decoder 206 includes a unidirectional LSTM (e.g., the decoder LSTM 266) with other components including the pointer network 262. The pointer network 262 includes simple multilayer preceptor with word logits. The pointer Softmax formulation is made up of two components—a shortlist Softmax layer and a location Softmax layer. The location Softmax layer includes the soft alignment scores which are computed from the annotation vector. The shortlist Softmax can be used to identify and copy a set of word tokens to be used in generating a given question. At 718, 'k' likely output sequences are thus obtained. More particularly, the decoder 206 includes a switch network 264 which interpolates between the shortlist Softmax layer and the location Softmax layer thereby providing a determination regarding the inclusion/exclusion of the word tokens from the output sequences. The beam search 280 produces a series of 'k' likely sequences. In addition, a teacher forcing network mechanism identifies the most likely occurrence of the next sequence or identifies at 720 a best sequence from the 'k' likely sequences which pertains to an automatically generated question. At 722, the question generator 144 is fine tuned using a set of rewards which can include question answering quality which determines effectiveness of the question generator 144 in answering unseen questions. _Another reward aspect can include fluency. Fluency refers to the syntactic and semantic aspects of a word sequence (i.e., the question). The rewards functions can be concurrently trained on the output from the answer generator 112 with user queries and the corresponding answers in order to improve accuracy of the question generator 144. Therefore, the automatic question answering system 100 incorporates aspects of reinforcement learning to retrain the question generator 144 with a set of reward functions.

Figure 8:
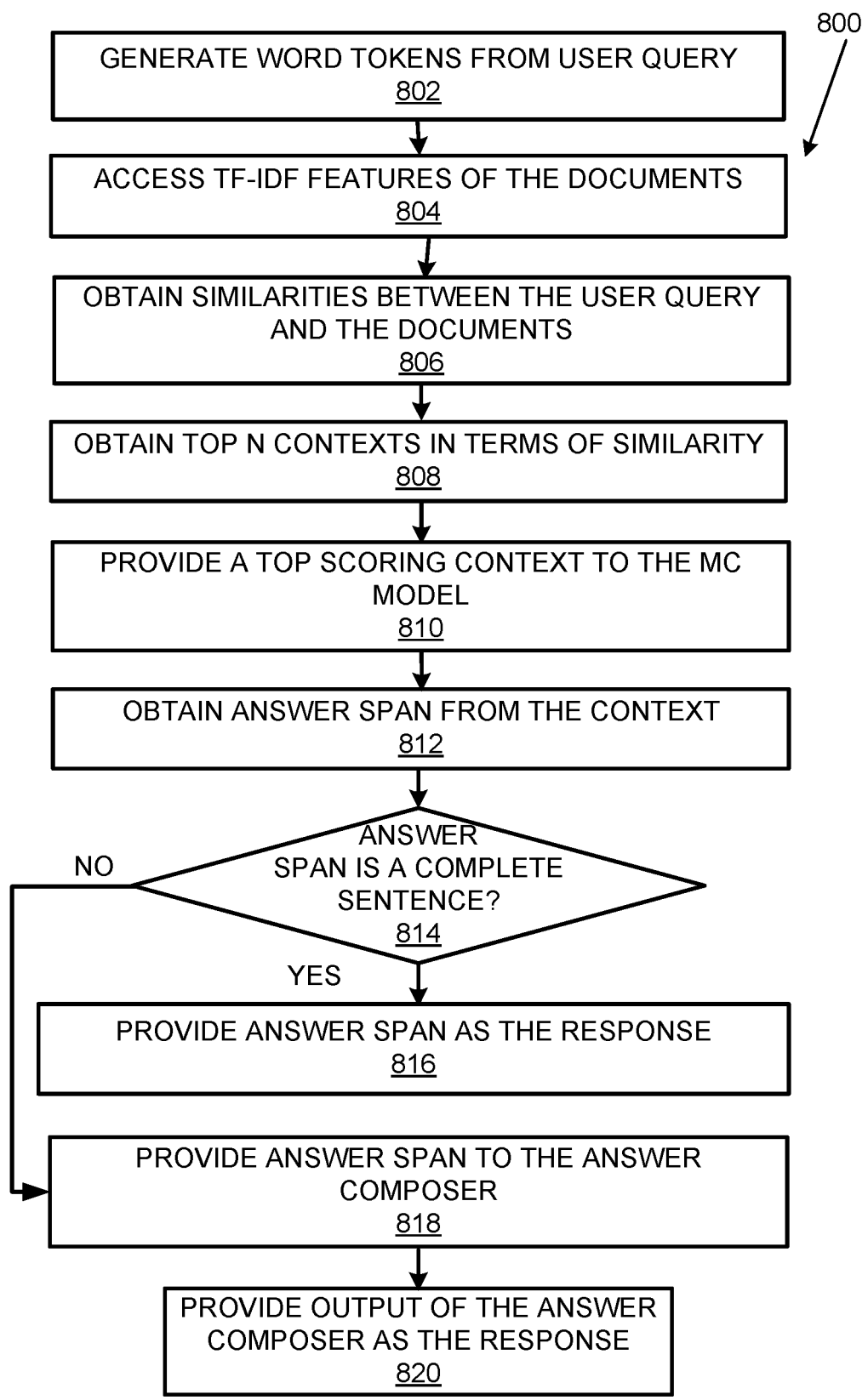
FIG. 8 shows a flowchart that details a method of identifying an answer span for the user query in accordance with the examples disclosed herein.

FIG. 8 shows a flowchart 800 that details a method of identifying the answer span 166 for the user query 192 in accordance with an example disclosed herein. At 802, the query processor 108 processes the user query 192 to generate word tokens. The tf-ldf features of the documents or contexts from the documents are accessed at 804. Each time a new document is accessed by the corpus builder 102, the tf-idf features based on the unigrams and bigrams are created. At 806, similarities between the user query 192 and the documents are obtained. In an example, cosine similarity can be estimated as a measure of similarity between the user query 192 and the plurality of documents 110. The top N contexts (e.g., the top three contexts) in terms of similarities are selected at 808. Therefore, there can be different answer spans from different contexts for the user query 192. A top scoring context 164 is provided to the MC model 106 at 810 which identifies the answer span 166 for the highest scoring context is at 812.

At 814, it is determined if the answer span 166 forms a complete sentence. In an example, the answer composer 184 can employ rules which include semantic and syntactic rules for the determination regarding the answer span 166. If it is determined at 814 that the answer span 166 forms a complete sentence, then the answer span 166 can be provided directly as the response 194 to the user query 192 at 816. If it is determined at 814 that the answer span 166 does not form a complete answer, the answer span 166 is provided to the answer composer at 818 and at 820, the output from the answer composer 184 is provided to the user posing the user query 192 as the response 194.

Figure 9:
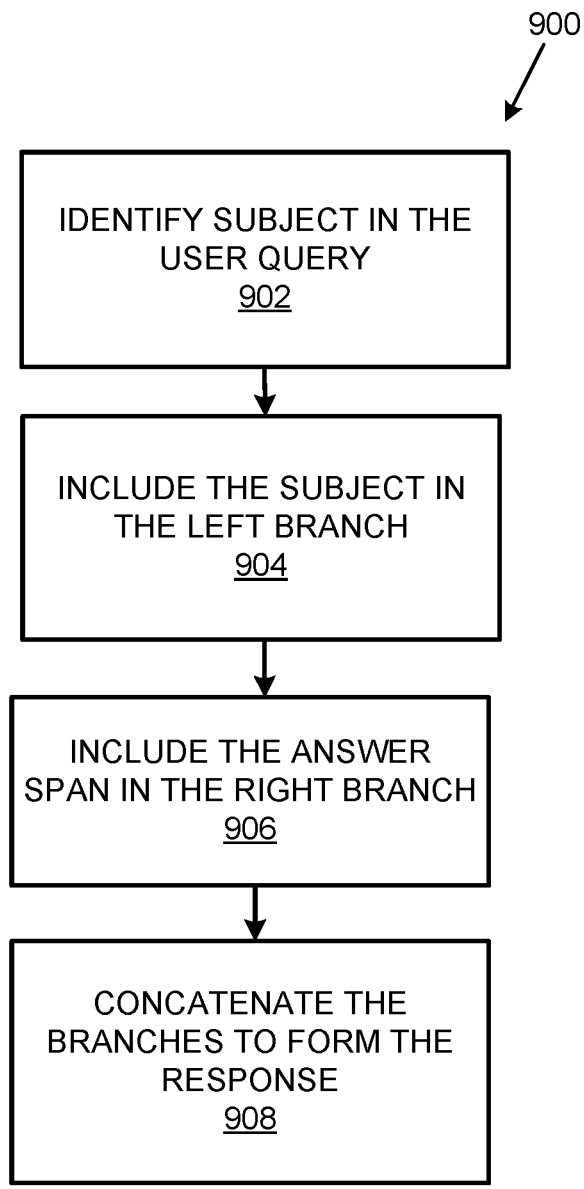
FIG. 9 shows a flowchart that details a method of generating a natural language like response incorporating an answer span in accordance with the examples disclosed herein.

FIG. 9 shows a flowchart 900 that details a method of generating the response 194 incorporating the answer span 166 identified from the documents by the MC model 106 in reply to the user query 192 according to an example. Natural language generation (NLG) is incorporated along with the answer span 166 by constructing a tree-structure with a specified set of rules separately targeting the different genre of questions pertaining to the specific structure of a sentence. The various types of questions can include what, when, where, how, why etc. An example of framing a response to a "when" question genre is discussed below for illustration purposes only. Other methods may be implemented while framing the response to other question genres in accordance with the examples disclosed herein. The subject in the user query 192 is identified at 902. The subject from the user query 192 is included in a left branch of a tree structure being constructed at 904. The answer span 166 identified by the MC model 106 in response to the user query 192 is included at 906 in the right branch of the tree structure. Both the branches are concatenated at 908 to form the complete NLG response. In an example, Simple NLG framework can be used to ensure that the grammar and the syntactic structure of a sentence, e.g., identifying the subject, exact verbs, objects and the additional components. More particularly, a set of rules based on the grammar can be established within the answer composer 184 and the framework can assemble parts of the sentence and assemble the parts into a grammatically accurate form based on the set of rules.

Figure 10:
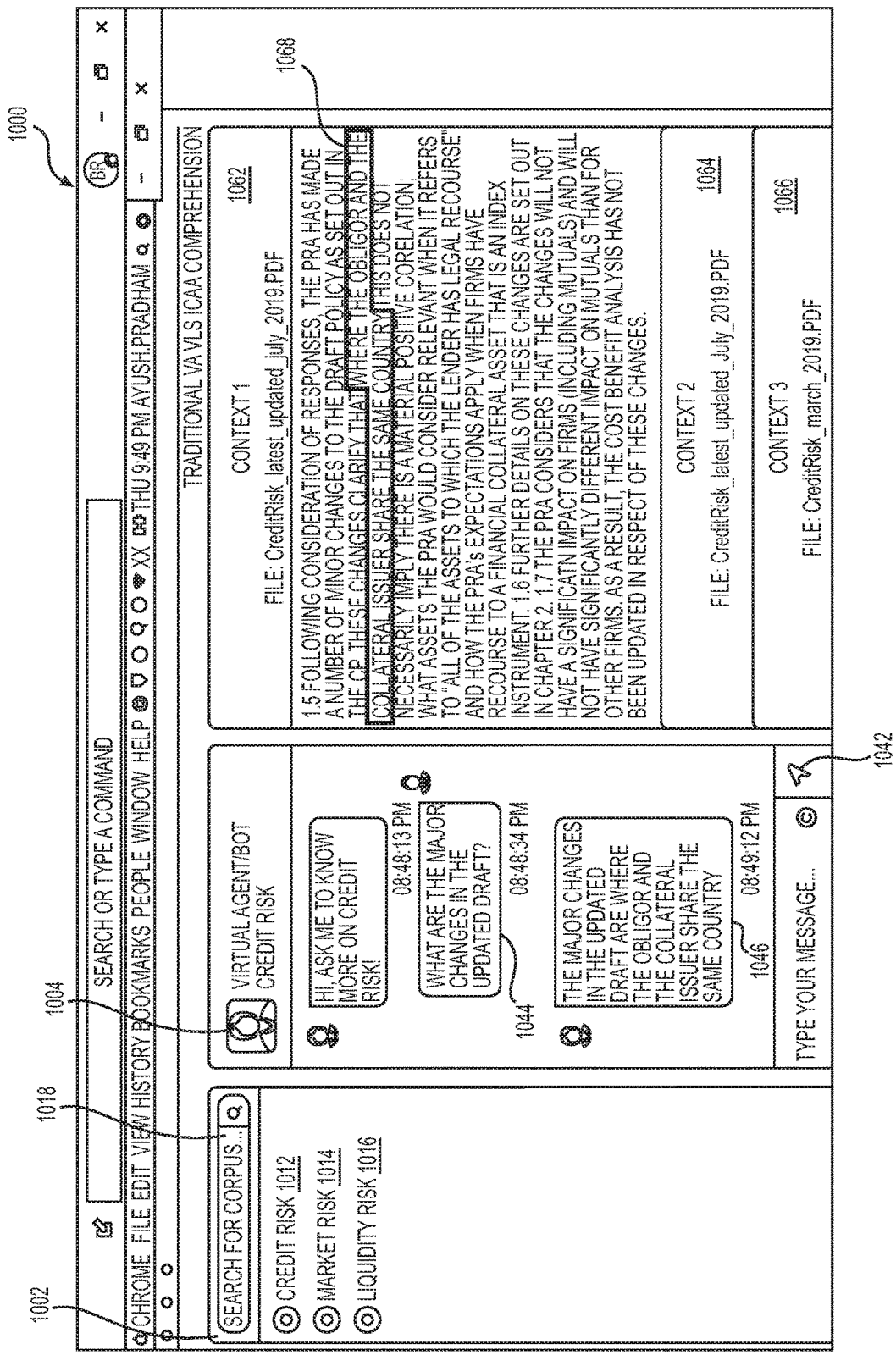
FIG. 10 shows a user interface of the automatic question answering system in accordance with the examples disclosed herein.

FIG. 10 shows an output user interface of the QA system 100 in accordance with the examples disclosed herein. On the left-hand side (LHS) is a corpus selection panel 1002 that allows user selection of a domain corpus to explore for information. Three domain corpora 1012, 1014 and 1016 relating to three different domains are shown for illustration purposes. The corpus selection panel 1002 also includes a search box 1018 that allows users to search for preloaded corpora in order to obtain answers to questions pertaining to the specific domain. The Q & A panel 1004 enables users to enter the user queries and provides responses to the user queries pertaining to the selected corpus or domain. The Q & A panel 1004 includes a query entry box 1042 that allows users to type a query. In an example, the QA system 100 may be configured with speech Application Programming Interfaces (APIs) so that the users may alternately speak their queries and the virtual agent can provide responses in both the text and/or voice formats. A user question 1044 regarding changes in the draft is received and a response 1046 which is grammatically accurate is provided. A third panel is also included wherein the third panel shows the various contexts 1062, 1064, 1066 that were determined to be relevant to the user question 1044. The top-scoring context 1062 from which an answer span 1064 for generating the response 1046 is obtained is displayed and the answer span 1068 is highlighted.

FIG. 11 shows various custom questions 1102 that were posed and a comparison of the answer spans selected by the various deep QuAns models 1104. For each of the questions 1, 2 and 3, the corresponding answer spans extracted by the various models are shown. In particular, when the responses generated by the various models for question no. 3 are compared, it is noted that the DeepQuAns model with pooling at the 10 layer produces the most detailed and accurate answer 1106 span from the corresponding context.

FIG. 12 shows a table 1200 with examples of responses generated to different user queries and the corresponding contexts used for generating the responses in accordance with the examples disclosed herein. Two user queries 1202 and 1204 corresponding to the healthcare domain are shown. The corresponding contexts 1212 and 1214 are used for extracting the answer spans 1222 and 1224 by the MC model 126. The answer spans 1222 and 1224 merely contain the relevant information but do not form grammatically accurate sentences. NLG employed by the answer generator 112 generates responses 1232 and 1234 in complete sentences.

Figure 13:
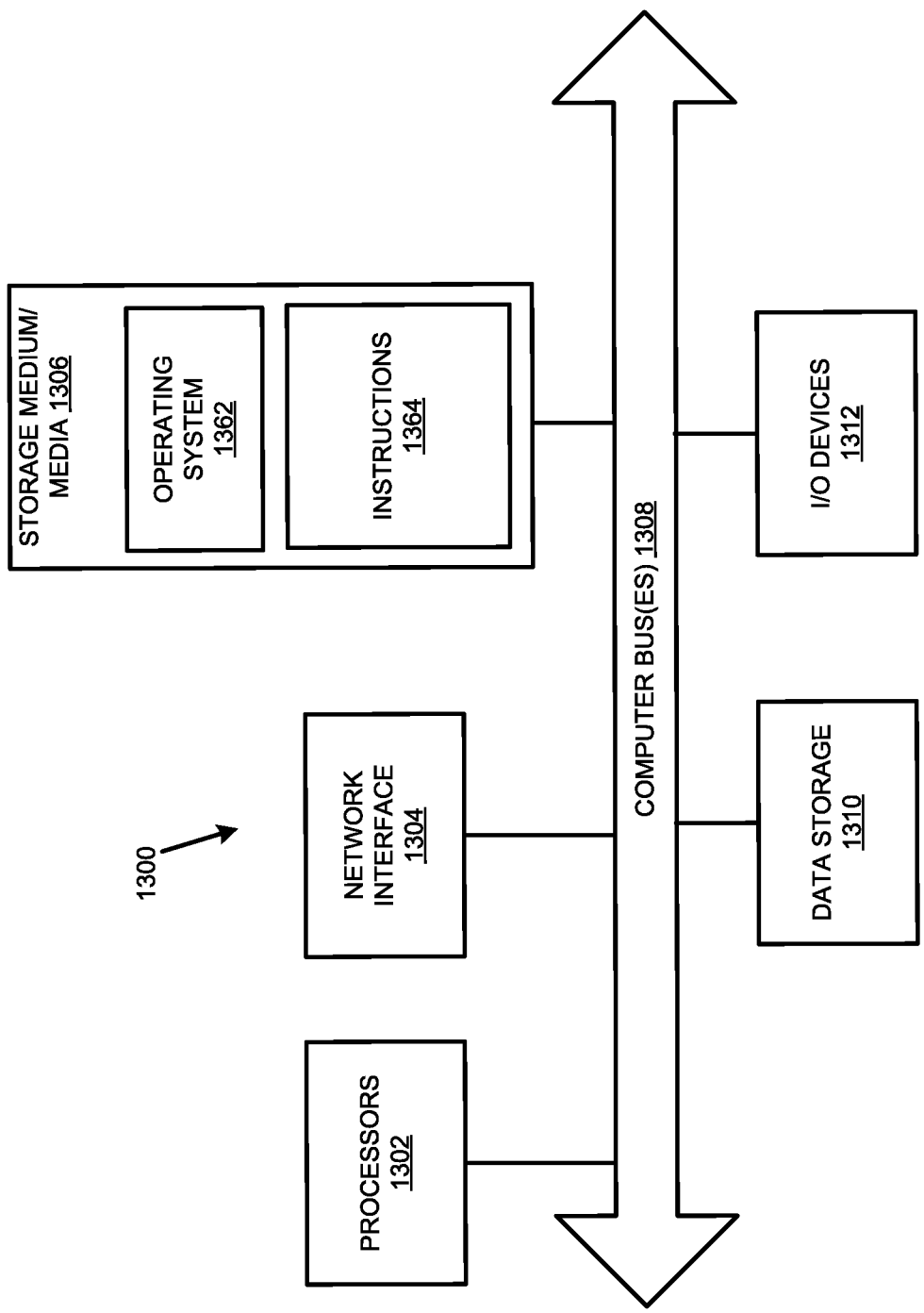
FIG. 13 illustrates a computer system that may be used to implement the automatic question answering system in accordance with the examples disclosed herein.

FIG. 13 illustrates a computer system 1300 that may be used to implement the automatic question answering system 100. More particularly, computing machines such as desktops, laptops, smartphones, tablets and wearables which may be used to generate or access the data from the automatic question answering system 100 may have the structure of the computer system 1300. The computer system 1300 may include additional components not shown and that some of the process components described may be removed and/or modified. In another example, a computer system 1300 can sit on external-cloud platforms such as Amazon Web Services, AZURE® cloud or internal corporate cloud computing clusters, or organizational computing resources, etc.

The computer system 1300 includes processor(s) 1302, such as a central processing unit, ASIC or other type of processing circuit, input/output devices 1312, such as a display, mouse keyboard, etc., a network interface 1304, such as a Local Area Network (LAN), a wireless 802.11x LAN, a 3G or 4G mobile WAN or a WiMax WAN, and a computer-readable medium 1306. Each of these components may be operatively coupled to a bus 1308. The computer-readable medium 1306 may be any suitable medium that participates in providing instructions to the processor(s) 1302 for execution. For example, the processor-readable medium 1306 may be non-transitory or non-volatile medium, such as a magnetic disk or solid-state non-volatile memory or volatile medium such as RAM. The instructions or modules stored on the processor-readable medium 1306 may include machine-readable instructions 1364 executed by the processor(s) 1302 that cause the processor(s) 1302 to perform the methods and functions of the automatic question answering system 100.

The automatic question answering system 100 may be implemented as software stored on a non-transitory processor-readable medium and executed by the one or more processors 1302. For example, the processor-readable medium 1306 may store an operating system 1362, such as MAC OS, MS WINDOWS, UNIX, or LINUX, and code 1364 for the automatic question answering system 100. The operating system 1362 may be multi-user, multiprocessing, multitasking, multithreading, real-time and the like. For example, during runtime, the operating system 1362 is running and the code for the automatic question answering system 100 is executed by the processor(s) 1302.

The computer system 1300 may include a data storage 1310, which may include non-volatile data storage. The data storage 1310 stores any data used by the automatic question answering system 100. The data storage 1310 may be used to store the queries from the end-users, the responses provided to the end-users, and other data that is used by the automatic question answering system 100.

The network interface 1304 connects the computer system 1300 to internal systems for example, via a LAN. Also, the network interface 1304 may connect the computer system 1300 to the Internet. For example, the computer system 1300 may connect to web browsers and other external applications and systems via the network interface 1304.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An automatic question answering system comprising:
at least one processor;
a non-transitory processor-readable medium storing machine-readable instructions that cause the processor to:
receive a plurality of documents, wherein the plurality of documents include one or more sections and the one or more sections include one or more sub-sections and wherein the plurality of documents pertain to a specific domain;
extract metadata of the plurality of documents wherein the metadata includes one or more of titles, a list of the one or more sections, a list of figures and tables, and a list of references;
identify each section in the list of the one or more sections from the plurality of documents, by identifying for each document, phrases that are all caps and phrases that are abbreviations, groups of words with font different from a font commonly used within the document, and groups of words aligned differently from a body of text following the groups of words;
generate one or more candidate answers using key entities extracted from each of the one or more sub-sections;
automatically generate questions based on each of the candidate answers;
train a machine comprehension (MC) model on at least the candidate answers and the questions, wherein the MC model is trained to identity answer spans to user queries from the plurality of documents and the MC model includes a 3-layer Question Answer (QA) architecture with a predetermined number of hidden neurons;
receive a query from a user, the query pertaining to the specific domain;
score a set of contexts using a term vector model scoring, wherein the scores indicate relevance of each of the set of contexts and the questions to the query from the user;
identify a top-scoring context from the set of contexts;
determine an answer span from the top-scoring context, the answer span being identified by the MC model; and
provide the answer span to the user as a reply to the query via an output user interface if the answer span forms a complete sentence,
else provide a response generated from the answer span as the reply to the query.

2. The question answering system of claim 1, wherein the processor is to further:
produce a stream of text by parsing each of the plurality of documents.

3. The question answering system of claim 2, wherein to identify the groups of words with different font, the processor is to further:
identify groups of words with a font that is one or more of bolded and italicized.

4. The question answering system of claim 2, wherein the processor is to further:
categorize each of the one or more sections into one of a caption, body text, table text, and image text, wherein the body text can include one or more paragraphs and the categorization occurs based at least on a font style, font size and text alignment.

5. The question answering system of claim 1, wherein to extract the key entities the processor is to further:
split textual content in the one or more sub-sections into word tokens.

6. The question answering system of claim 5, wherein to generate the one or more candidate answers, the processor is to further:
select the key entities from the word tokens based at least on a frequency of occurrence of the word tokens in the one or more, sub-sections and positioning of the word tokens within the one or more sub-sections wherein the word tokens occurring at beginning of sentences are weighted for the selection;
extract features for the word tokens, wherein the features include word frequency within the one or more sub-sections and frequency of occurrence of the word tokens in different sentences;
generate a single term score (TS) for each of the word tokens via conglomerating the extracted features heuristically;
generate sequences of n-grams from the word tokens in the sub-sections;
for each of the n-grams,
multiply the single term score of a word token in the n-gram with the single term scores of other word tokens in the n-gram; and
obtain a final score based on the multiplication of the single term scores.

7. The question answering system of claim 6, wherein to generate the one or more candidate answers, the processor is to further:
de-duplicate the n-grams generated from each of the one or more sub-sections; and select top N (where N is a natural number) n-grams with highest final scores as a subset of the candidate answers generated from a document of the plurality of documents.

8. The question answering system of claim 5, wherein to automatically generate the questions, the processor is to further:
access the word tokens and contexts from each of the plurality of documents;
indicate presence of each of the word tokens in each of the plurality of documents by augmenting embedding vectors with a binary feature;
generate a compound vector for each of the embedding vectors by passing the embedding vectors through a deep bi-directional Long Short Term Memory (LSTM) layer wherein the compound vector is obtained via concatenation of cell forward states and cell backward states of the LSTM layer; and
generate thought vectors by passing context embeddings augmented with answer embeddings through the LSTM layer.

9. The question answering system of claim 8, wherein to automatically generate questions, the processor is to further:
provide the thought vectors to a decoder including a unidirectional LSTM; and
obtain the questions by aggregating consecutive cell states with the thought vectors.

10. The question answering system of claim 1, wherein the MC model is further configured to identify a start position and an end position within a context fir an answer span to the query received from the user.

11. The question answering system of claim 10, wherein the 3 layer Q/A architecture is made up of linear layers with each linear layer having a hidden size of 384.

12. The question answering system of claim 10, wherein the 3-layer QA architecture is made up of two linear layers with each linear layer having a hidden size of 384 followed by a third linear layer with a hidden size of 192.

13. The question answering system of claim 10, wherein the 3-layer architecture includes pooling at a $7^{th}$, $9^{th}$ and 10th layer of an encoder.

14. The question answering system of claim 1, wherein the processor is to:
train the MC model on a generic dataset in addition to the candidate answers and the questions.

15. A method comprising:
receiving a user selection of one of a plurality of domain corpora for answering questions pertaining to a domain;
receiving a user query pertaining to the domain;
extracting parts of speech (POS) data associated with tokens generated from the user query wherein the POS data includes a subject of the user query;
using a term vector model scoring for determining a context from a set of contexts relevant to the user query;
providing the user query and the context determined as relevant to the user query to a machine comprehension (MC) model trained to identify an answer span responsive to the user query, wherein the MC model is trained on a plurality of documents specific to the domain and the plurality of documents include a section and a sub-section;
receiving the answer span identified by the MC model from the relevant context as responsive to the user query;

building a tree-structure using the subject from the user query and the answer span;
generating a response to the user query by concatenating the subject and the answer span; and
providing the response to the user as a reply to the user query via an output user interface.

16. The method of claim 15, further comprising:
providing a user interface that enables the user selection of one of the plurality of domain corpora.

17. The method of claim 15, further comprising:
enabling a display of a plurality of contexts matching the user query with the answer span highlighted on a corresponding context of the plurality of contexts.

18. The method of claim 15, wherein training the MC model further comprises:
generating candidate answers from the plurality of documents specific to the domain;
automatically generating questions corresponding to the candidate answers; and
training the MC model on the candidate answers and the questions.

19. A non-transitory processor-readable storage medium comprising machine-readable instructions that cause a processor to:
receive a plurality of documents, wherein the plurality of documents include one or more sections and the one or more sections include one or more sub-sections and wherein the plurality of documents pertain to a specific domain;
extract metadata of the plurality of documents wherein the metadata includes one or more of titles, a list of the one or more sections, a list of figures and tables, and a list of references;
identify each section in the list of the one or more sections from the plurality of documents, by identifying for each document, phrases that are all caps and phrases that are abbreviations, groups of words with font different from a font commonly used within the document, and groups of words aligned differently from a body of text following the groups of words;
generate one or more candidate answers using key entities extracted from each of the one or more sub-sections;
automatically generate questions based on each of the candidate answers;
train a machine comprehension (MC) model on at least the candidate answers and the questions, wherein the MC model is trained to identify answer spans to user queries from the plurality of documents and the MC model includes a 3-layer Question Answer (QA) architecture with a predetermined number of hidden neurons;
receive a query from a user, the query pertaining to the specific domain;
score a set of contexts using a terra vector model scoring, Wherein the scores indicate relevance of each of the set of contexts and the questions to the query from the user;
identify a top-scoring context from the set of contexts;
determine an answer span from the top-scoring context, the answer span being identified by the MC model; and
provide the answer span to the user as a reply to the query via an output user interface if the answer span forms a complete sentence,
else provide a response generated from the answer span as the reply to the query.

20. The non-transitory processor-readable storage medium of claim 19, wherein a Seq2Seq model is employed for automatically generating the questions based on the candidate answers.

* * * * *

UNITED STATES PATENT AND TRADEMARK OFFICE
CERTIFICATE OF CORRECTION

PATENT NO. : 11,449,556 B2
APPLICATION NO. : 16/781590
DATED : September 20, 2022
INVENTOR(S) : Harsha Jawagal et al.

It is certified that error appears in the above-identified patent and that said Letters Patent is hereby corrected as shown below:

In the Claims

At Claim 1, Column 15, Line 2 from the bottom, the phrase "trained to identity" should instead read "trained to identify".

At Claim 10, Column 17, Line 31 from the top, the phrase "context fir an answer" should instead read "context for an answer".

At Claim 11, Column 17, Line 34 from the top, the phrase "3 layer Q/A" should instead read "3-layer QA".

At Claim 13, Column 17, Line 41 from the top, the phrase "3-layer architecture" should instead read "3-layer QA architecture".

At Claim 19, Column 18, Line 11 from the bottom, the phrase "using a terra" should instead read "using a term".

At Claim 19, Column 18, Line 10 from the bottom, the phrase "Wherein the scores" should instead read "wherein the scores".

Signed and Sealed this
Fifteenth Day of August, 2023

Katherine Kelly Vidal
*Director of the United States Patent and Trademark Office*